(12) United States Patent
Sarkar et al.

(10) Patent No.: US 12,566,786 B2
(45) Date of Patent: Mar. 3, 2026

(54) NATURAL LANGUAGE PROCESSING WORKFLOW FOR RESPONDING TO CLIENT QUERIES

(71) Applicant: HEWLETT PACKARD ENTERPRISE DEVELOPMENT LP, Houston, TX (US)

(72) Inventors: Soumyendu Sarkar, Milpitas, CA (US); Rohit Rawat, Milpitas, CA (US); Vineet Gundecha, Bangalore (IN); Sahand Ghorbanpour, Milpitas, CA (US); Abhishek Jindal, Milpitas, CA (US); Paolo Faraboschi, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 115 days.

(21) Appl. No.: 17/498,124

(22) Filed: Oct. 11, 2021

(65) Prior Publication Data

US 2023/0034011 A1 Feb. 2, 2023

(30) Foreign Application Priority Data

Jul. 29, 2021 (IN) .............................. 202141034087

(51) Int. Cl.
*G06F 16/00* (2019.01)
*G06F 16/334* (2025.01)
(Continued)

(52) U.S. Cl.
CPC ........ *G06F 16/3344* (2019.01); *G06F 16/338* (2019.01); *G06F 40/216* (2020.01); *G06N 20/00* (2019.01)

(58) Field of Classification Search
CPC .. G06F 16/3344; G06F 16/338; G06F 40/216; G06N 20/00
(Continued)

(56) References Cited

U.S. PATENT DOCUMENTS 9,158,773 B2 10/2015 Clark et al.
11,500,865 B1 * 11/2022 Wang ................... G06F 16/243
(Continued)

OTHER PUBLICATIONS

Baudis, P., "YodaQA: A Modular Question Answering System Pipeline," Poster 2015, 19th Int'l Student Conference on Electrical Engineering, pp. 1156-1165, http://allao.eu/yodaqa/yodaqa-poster2015. pdf.

(Continued)

*Primary Examiner* — Raquel Perez-Arroyo
(74) *Attorney, Agent, or Firm* — Hewlett Packard Enterprise Patent Department

(57) ABSTRACT

Examples described herein include a natural language processing (NLP) workflow for determining answers to queries. A query is received from a first client of a plurality of clients. A set of machine learning (ML) models are selected based on available service provider resources for processing the query. Each of the set of ML models corresponds to a respective stage of a NLP workflow. The query is input to a first model of the set of ML models. According to the NLP workflow, results from the first model are input to a second model of the set of ML models to determine a final result. A query answer based on the final result is transmitted to the first client.

18 Claims, 6 Drawing Sheets

(51) Int. Cl.
    *G06F 16/338*       (2019.01)
    *G06F 40/216*       (2020.01)
    *G06N 20/00*        (2019.01)

(58) Field of Classification Search
    USPC ........................................................ 707/769
    See application file for complete search history.

(56)              References Cited

U.S. PATENT DOCUMENTS

| | | | | |
|---|---|---|---|---|
| 2016/0078361 | A1* | 3/2016 | Brueckner | H04L 67/10 |
| | | | | 706/12 |
| 2016/0196313 | A1 | 7/2016 | Allen et al. | |
| 2016/0203148 | A1 | 7/2016 | Allen et al. | |
| 2017/0132141 | A1* | 5/2017 | Allen | G06N 20/00 |
| 2019/0073916 | A1 | 3/2019 | Allen et al. | |
| 2019/0171766 | A1* | 6/2019 | Gao | G06N 20/00 |
| 2019/0244621 | A1* | 8/2019 | Halstvedt | G06F 3/165 |
| 2020/0218722 | A1 | 7/2020 | Mai et al. | |
| 2021/0042085 | A1* | 2/2021 | Guttmann | G06F 16/24565 |
| 2021/0117977 | A1* | 4/2021 | Kim | G06F 18/214 |
| 2022/0239758 | A1* | 7/2022 | Klein | H04L 67/10 |

OTHER PUBLICATIONS

Toews, R., "The Next Generation of Artificial Intelligence (Part 2)," Oct. 29, 2020, https://www.forbes.com/sites/robtoews/2020/10/29/the-next-generation-of-artificial-intelligence-part-2/.

AWS, "Amazon Kendra", available online at <https://web.archive.org/web/20191203183255/https://aws.amazon.com/kendra/>, Dec. 3, 2019, 8 pages.

Devlin et al., "BERT: Pre-training of Deep Bidirectional Transformers for Language Understanding", May 24, 2019, 16 pages.

Eli David et al., "How Can Businesses Take Deep Learning Out Of The Lab And Onto Intelligent Edge Devices?", available online at <https://www.forbes.com/councils/forbestechcouncil/2020/08/19/how-can-businesses-take-deep-learning-out-of-the-lab-and-onto-intelligent-edge-devices/>, Aug. 19, 2020, 9 pages.

Github, "bert-as-service Documentation", available online at <https://bert-as-service.readthedocs.io/en/latest/>, 2018, 3 pages.

Lee et al., "BioBERT: a pre-trained biomedical language representation model for biomedical text mining", 2019, 7 pages.

Liu et al., "ROBERTa: A Robustly Optimized BERT Pretraining Approach", Jul. 26, 2019, 13 pages.

Rajpurkar et al., "KnowWhatYouDon't Know: Unanswerable Questions for SQUAD", Jun. 11, 2018, 9 pages.

Rajpurkar et al., "SQUAD: 100,000+ Questions for Machine Comprehension of Text", Oct. 11, 2016, 10 pages.

Tania Lorido-Botran, "A Review of Auto-scaling Techniques for Elastic Applications in Cloud Environments", Journal of Grid Computing · Dec. 2014, 26 pages.

Vaswani et al., "Attention Is All You Need", Aug. 2, 2023, 15 pages.

Wang et al., "The Covid-19 Open Research Dataset", Jul. 10, 2020, 12 pages.

Wolf et al., "Transformers: State-of-the-Art Natural Language Processing", Jul. 14, 2020, 8 pages.

\* cited by examiner

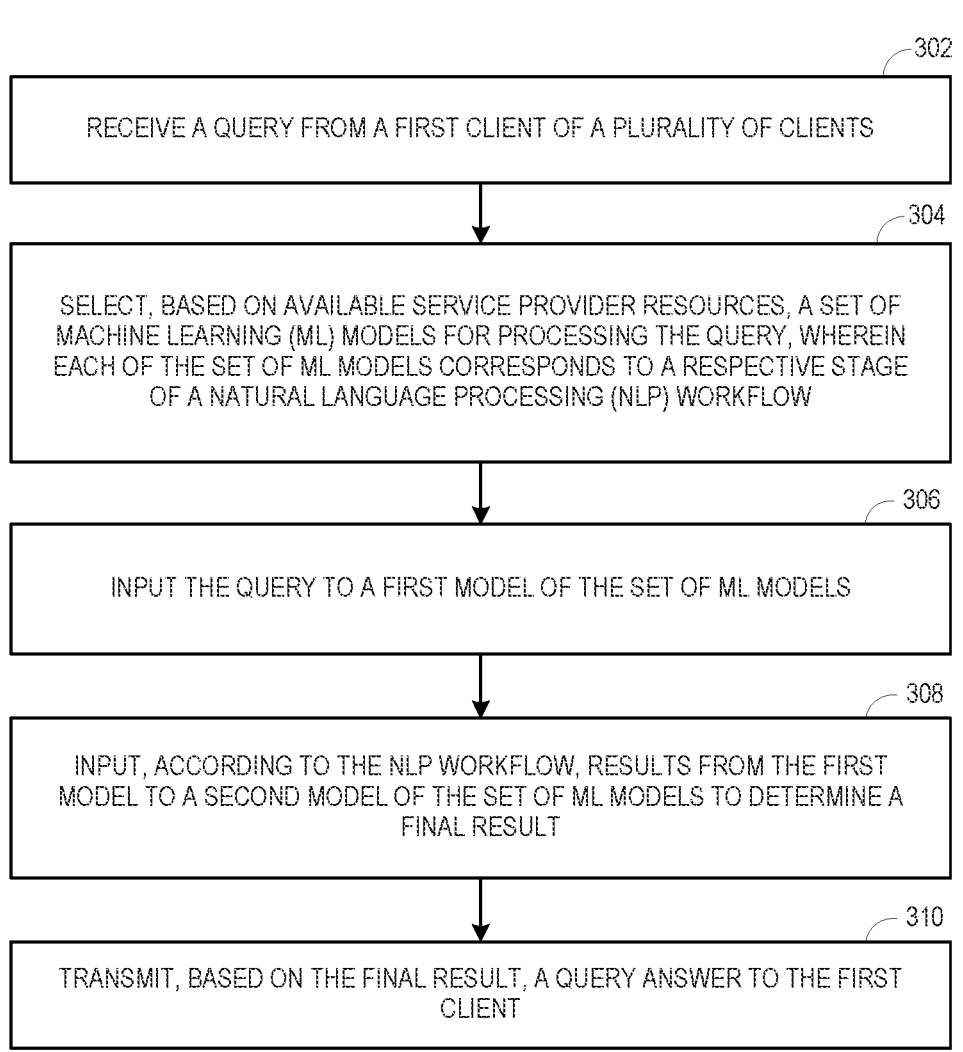

300

302

RECEIVE A QUERY FROM A FIRST CLIENT OF A PLURALITY OF CLIENTS

304

SELECT, BASED ON AVAILABLE SERVICE PROVIDER RESOURCES, A SET OF MACHINE LEARNING (ML) MODELS FOR PROCESSING THE QUERY, WHEREIN EACH OF THE SET OF ML MODELS CORRESPONDS TO A RESPECTIVE STAGE OF A NATURAL LANGUAGE PROCESSING (NLP) WORKFLOW

306

INPUT THE QUERY TO A FIRST MODEL OF THE SET OF ML MODELS

308

INPUT, ACCORDING TO THE NLP WORKFLOW, RESULTS FROM THE FIRST MODEL TO A SECOND MODEL OF THE SET OF ML MODELS TO DETERMINE A FINAL RESULT

310

TRANSMIT, BASED ON THE FINAL RESULT, A QUERY ANSWER TO THE FIRST CLIENT

FIG. 3

NATURAL LANGUAGE PROCESSING WORKFLOW FOR RESPONDING TO CLIENT QUERIES

BACKGROUND

Natural Language Processing (NLP) is a branch of artificial intelligence that enables computers to understand, process, and generate language used by humans. NLP includes techniques that are implemented on a computer to perform language-related tasks, such as retrieving and searching for information on a wide range of topics. For example, NLP applications (e.g., Question-Answering applications) may perform complex operations on vast amounts of text data to automatically provide answers to queries asked by users. To carry out the complex operations, the NLP applications may be deployed and executed on large amounts of computing resources, which may be available on servers in a datacenter, for example.

In some solutions, the computing resources in servers are leased by cloud providers or vendors to provide on-demand services to customers on a subscription basis. Such a model of providing service to customers is commonly referred to as "as a Service" (aaS). The services may include physical resources, software resources, and the like. Broadly, as a Service models have been categorized as Software as a Service (SaaS) that provides on-demand software, Platform as a Service (PaaS) that provides platform tools for developing software, and Infrastructure as a Service (IaaS) that virtually provides storage resources, compute resources, and the like.

With advancements in cloud-native technologies, specialized on-demand solutions may be provided to customers. For example, applications or workloads may be developed as a set of microservices running in containers, which are easy to develop and deploy over multiple servers. A container may include an application component and its necessary dependencies into one package so that the component is executable in different servers. This allows vendors and operators to quickly develop and scale applications and provide improved as-a-Service solutions.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein:

FIG. 3 is a flow diagram depicting a method for determining answers to queries using an NLP workflow, in accordance with an example;

Figure 1:
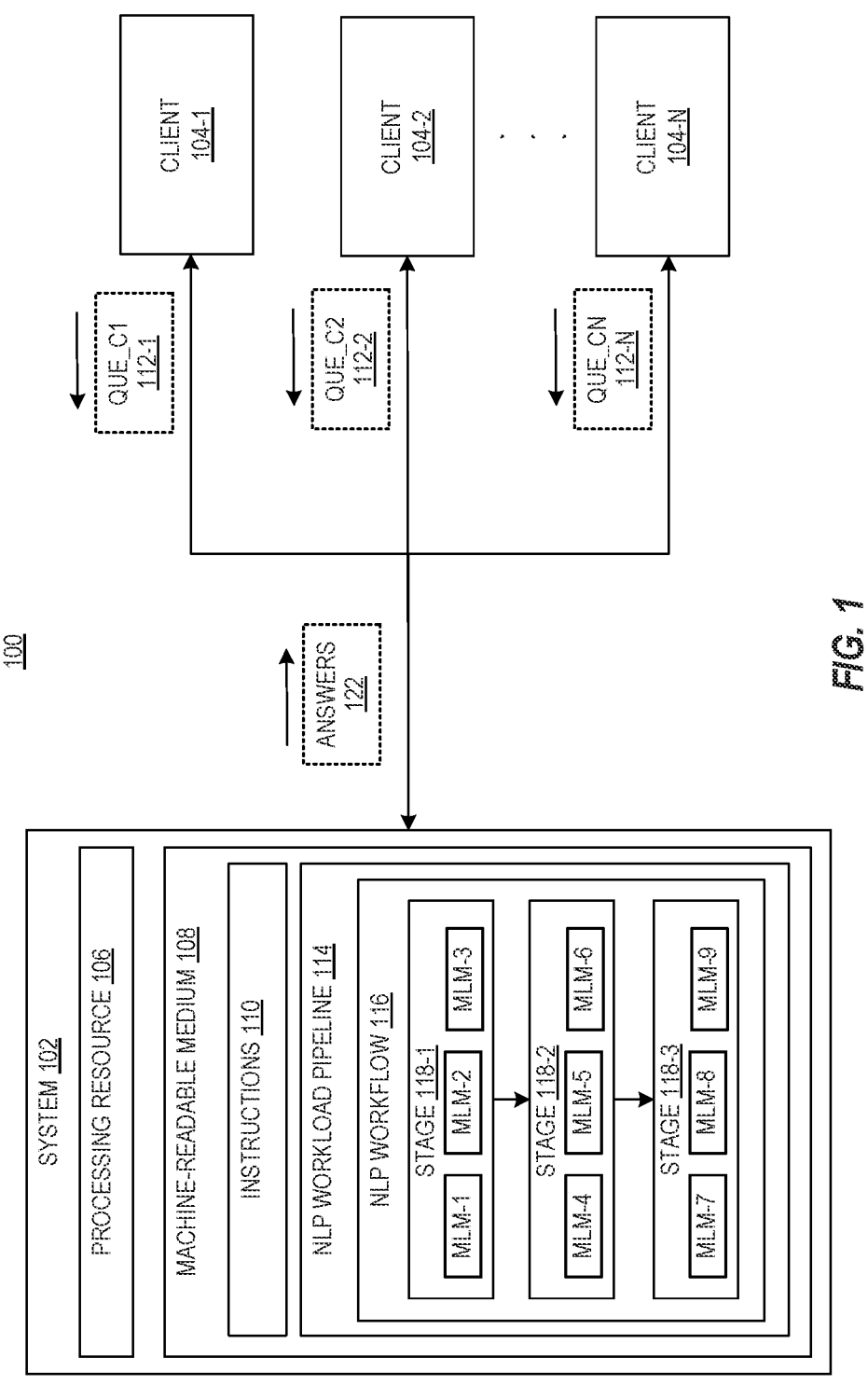
FIG. 1 depicts a network including a system implementing a Natural Language Processing (NLP) workflow for answering queries, in accordance with an example.

It is emphasized that, in the drawings, various features are not drawn to scale. In fact, in the drawings, the dimensions of the various features may have been increased or reduced for clarity of discussion.

DETAILED DESCRIPTION

As enterprises continue to adopt and fully leverage the capabilities of cloud-native technologies to improve their operations, many enterprises are looking to as-a-Service (aaS) to provide technical solutions, such as natural language processing (NLP), on demand, NLP-aaS provides the ability to dynamically provision the resources needed to implement an NLP solution on demand and without costly and laborious installation and configuration of hardware or software on premises or in a rented cloud environment. NLP-aaS is also cost effective because payment is only charged when the service is provisioned and used. However, NLP and other machine learning solutions can be resource intensive, especially when a large number of requests from clients (e.g., queries) are received in a short period of time.

NLP is not a single algorithm that provides a single solution to a given query. NLP is a class of problem that can be solved using machine learning. NLP, like other machine learning genres, may use any number of different algorithms, workflows, and techniques to determine a heuristic solution to a class of data related problems, specifically problems related to understanding natural language used by humans. Different algorithms, workflows, and techniques may have different performance characteristics, including different resource utilization per client query. However, there may be tradeoffs when selecting a certain algorithm, workflow, or technique optimized for performance characteristics, such as loss of accuracy, reduced completeness of results, and the like.

Furthermore, computation requirements and performance characteristics may be different for each component in an NLP solution. The components of an NLP solution may each utilize different amounts of heterogeneous computation resources like processing and storage resources, such as Graphics Processing Units (GPU), Central Processing Units (CPU), cache, and memory components. In many implementations, NLP solutions use an interleaved GPU and CPU computation workflow, which can result in low occupancy of certain service provider resources, such as GPU accelerators, even during high loads of other resources, such as CPU resources.

These resource utilization challenges are especially acute when client usage results in widely varying loads with sharp peaks. For example, Question-Answering NLP applications may receive queries from clients in a seasonal pattern, with queries relating to a particular topic being received substantially more frequently at certain times of day, week, month, or year. A sharp increase in number of queries may lead to inefficient usage of resources in servers that are dedicated, in part or on the whole, to providing an NLP service. Clients of an aaS solution often have pre-negotiated service level agreements (SLAs) that define the minimum performance requirements guaranteed by the service provider to the client. To meet the required SLAs, NLP-aaS providers may overprovision service provider resources to accommodate fluctuations in the number and complexity of queries. The complexity of a query may be related to how complex the query itself is, but also may be related to how complex determining an answer to the query is. By overprovisioning the service provider resources, the service provider accumulates idle capacity (i.e., service provider resources that are not often used to their fullest). The idle capacity can incur a high cost resulting in the NLP-aaS solution becoming expensive to the clients.

In an example consistent with this disclosure, the NLP-aaS system determines answer for a query by executing an NLP workflow. The NLP workflow includes execution of multiple stages each including a plurality of machine learning (ML) models. On receiving the query, a set of ML models is selected based on available service provider resources for processing the query. Each ML model of the set of ML model corresponds to a particular stage of the NLP workflow. The NLP workflow defines a specific order of execution of the stages, such that the results obtained from execution of a first model of a stage are provided as input to a second model of a subsequent stage. A query answer is determined based on results obtained by execution of all the stages and is transmitted to the client.

Examples of this disclosure improve the technical field of NLPaaS implemented in cloud-based systems. The technical improvements are achieved in devices and systems including, but not limited to, servers, cluster of servers, and other systems providing NLP-aaS solutions. Examples of this disclosure allow granular control over of execution of NLP workloads to provide efficient utilization of resources and to reduce idle time periods of hardware resources. Examples of this disclosure improve the ability of servers by, among other things, dynamically selecting ML models during peak loads and provide continuous service even during widely varying sharp peaks. Further, servers providing NLP-aaS may use the examples presented herein to avoid redundancy, i.e., extra capacity of expensive hardware resources (e.g., GPUs), which lowers the operating cost of extra capacity of server clusters. Additionally, the dynamic selection and execution of ML models described herein achieves lower latency and higher throughput of responses.

FIG. 1 describes an example network 100 including a system 102 and a plurality of clients 104-1 to 104-N. The system 102 receives a plurality of queries 112-1 to 112-N from the plurality of clients 104-1 to 104-N over the network 100. In some examples, the network 100 is a distributed network where the system 102 and plurality of clients 104-1 to 104-N are located at physically different locations (e.g., on different racks, on different enclosures, in different buildings, in different cities, in different countries, and the like) while being connected via the network 100. In other examples, any combination of the system 102 and the plurality of clients 104-1 to 104-N may be co-located, including running as separate virtual devices on the same physical device. In FIG. 1, although the network 100 is shown to include one system 102 and three clients 104-1, 104-2, . . . , 104-N, the network 100 may include any number of systems and clients, without limiting the scope of the present disclosure.

Although, in certain sections of the description hereinafter, the operations/functionalities are described with reference to the system 102 processing a query 112-1 (labeled as QUE_C1) received from the client 1041, similar operations/functionalities may also be performed in respect of each of the other chants 104-2 to 104-N.

The system 102 is a heterogeneous computing system including an example processing resource 106 and an example machine-readable medium 108. The processing resource 106 may include different types of processing units (also referred to as service provider resources), such as Central Processing Unit (CPU), Graphical Processing Unit (GPU), and the like. The machine-readable medium 108 includes memory resources (e.g., cache memory), storage resources (e.g.; non-volatile storage devices), and the like. The machine readable medium 108 stores instructions 110 and a Natural Language Processing (NLP) workload pipeline 114. The instructions 110 are executable by the processing resource 106 to determine answers to the queries 112-1 to 112-N using the NLP workload pipeline 114. In some examples, instructions 110 include NLP workload pipeline 114.

The NLP workload pipeline 114 defines a software architecture to execute NLP workloads (not shown in FIG. 1) on the system 102 for determining answers to queries 112-1 to 112-N. The architecture includes one or more stages 118-1 to 118-3 that are linked to together according to an NLP workflow 116. The one or more stages 118-1 to 118-3 may correspond to components of an NLP workload, for example. Each component may perform an NLP operation for processing the queries 112-1 to 112-N. The NLP workflow 116 defines a specific order of execution of stages 118-1 to 118-3. The results obtained from execution of one stage is provided as input to the next stage in the order defined by the NLP workflow 116. For example, for a given input query, and based on the NLP workflow 116, stage 118-1 may be executed first, stage 118-2 may be executed second, and stage 118-3 may be executed last. The query 112-1 may be provided as input to the stage 1181 and an output of the stage 118-1 may be provided as input to stage 118-2, and output of stage 118-2 may be provided as input to stage 118-3. In some examples, the NLP workload pipeline 114 may include other NLP workflows defining an order of execution of the stages different from that of the NLP workflow 116.

Each stage 118-1 to 118-3 includes a plurality of Machine Learning (ML) models (labeled as MLM-1, MLM-2, MLM-3, MLM-9). The execution of a stage (e.g., 118-1) includes executing one or more ML models (e.g., MLM-1, MLM-2, or MLM-3) in that stage. Each ML model has a service provider resource specification. The service provider resource specification indicates a resource type and a resource consumption level for execution of the associated ML model. The resource type may indicate the type of resource (e.g., CPUs, GPUs, etc.) to be used for execution of the ML model. The resource consumption level indicates the degree of consumption of those resources. Examples of the resource consumption levels may include high resource consumption level, moderate resource consumption level, low resource consumption level, and the like. For example, the resource type for executing a first ML model MLM-1 may include a CPU and the associated resource consumption level may be high consumption level of CPU. The service provider resource specification for a certain ML model may include resource consumption information for multiple types of resources.

During operation of the system 102, the processing resource 106 receives a first query 112-1 from the client 104-1. The processing resource 106 selects a first set of machine learning (ML) models for processing the first query 112-1. Each model in the set of ML models corresponds to a respective stage in the NLP workflow. For example, the set of ML models may include MLM-1, MLM-2, and MLM-2, where MLM-1 corresponds to stage 118-1, MLM-4 corresponds to stage 118-2, and MLM-7 corresponds to stage 118-3. In some examples, the selection of the first set of ML models is performed based on available service provider resources on the system 102. For example, a utilization of the service provider resources may be determined. Based on the utilization and the service provider resource specification of the ML models, a ML model is selected from each stage of the NLP workflow.

The first query 112-1 is provided as input to a first model from the set of ML models selected. For example, the first query 112-1 is provided as input to the first ML model (e.g., MLM-1) of the first stage 118-1 in the NLP workflow 116. The first ML model MLM-1 is executed by the service provider resources to determine a first result. The first result from the first ML model (in the first stage 118-1) is provided as input to a second mod& (e.g., MLM-4) of the next stage (e.g., 118-2) according to the order defined in the NLP workflow 116. A second result determined by executing the second model MLM-4 is provided as input to a third ML model (e.g., MLM-7) of the subsequent stage (e.g., 118-3). A final result is determined by executing the third ML model. Based on the final result, a query answer is transmitted to the first client 1041.

In some examples, the system 102 receives a second query 1122 (labeled as QUE_C2) from the second client 104-2. The second query 1122 is received during the processing of, or along with, the first query 112-1. The processing resource 106 selects a second set of ML models in a manner similar to the selection of first set of ML models. The second set of ML models may be different from the first set of ML models. For example, the second set of ML models include MLM-2, MLM-5 and MLM-8. The second query 112-2 is provided as input to a fourth ML model (e.g., MLM-2) of the first stage 118-1 in the NLP workflow 116. The results obtained from executing the fourth ML model (i.e., the first stage 118-1) is provided as input to a fifth ML model (e.g., MLM-5) of the second stage (e.g., 118-2). The results obtained from executing the fifth ML model is provided as input to a sixth ML model of the second stage. A final result is determined using sixth ML model (e.g., MLM-8) of the third stage (e.g., 118-3). Based on the final result, a query answer is transmitted to the second client 104-2.

In this manner, the processing resource 106 selects a set of ML models for each query received from the respective clients 104-1 to 104-N. The NLP workflow 116 allows processing of multiple queries from the clients 104-1 to 104-N. Specifically, each stage (e.g., 118-1) is executed independently from other stages (e.g., 118-2, 118-3) in the NLP workflow 116. In one instance, the first stage 118-1 may be executed for second query 1122 and the second stage 118-2 may be executed for the first query 112-1. In such an instance, the first stage 118-1 and 118-2 may be executed separately and in parallel by the service provider resources of system 102.

Figure 2:
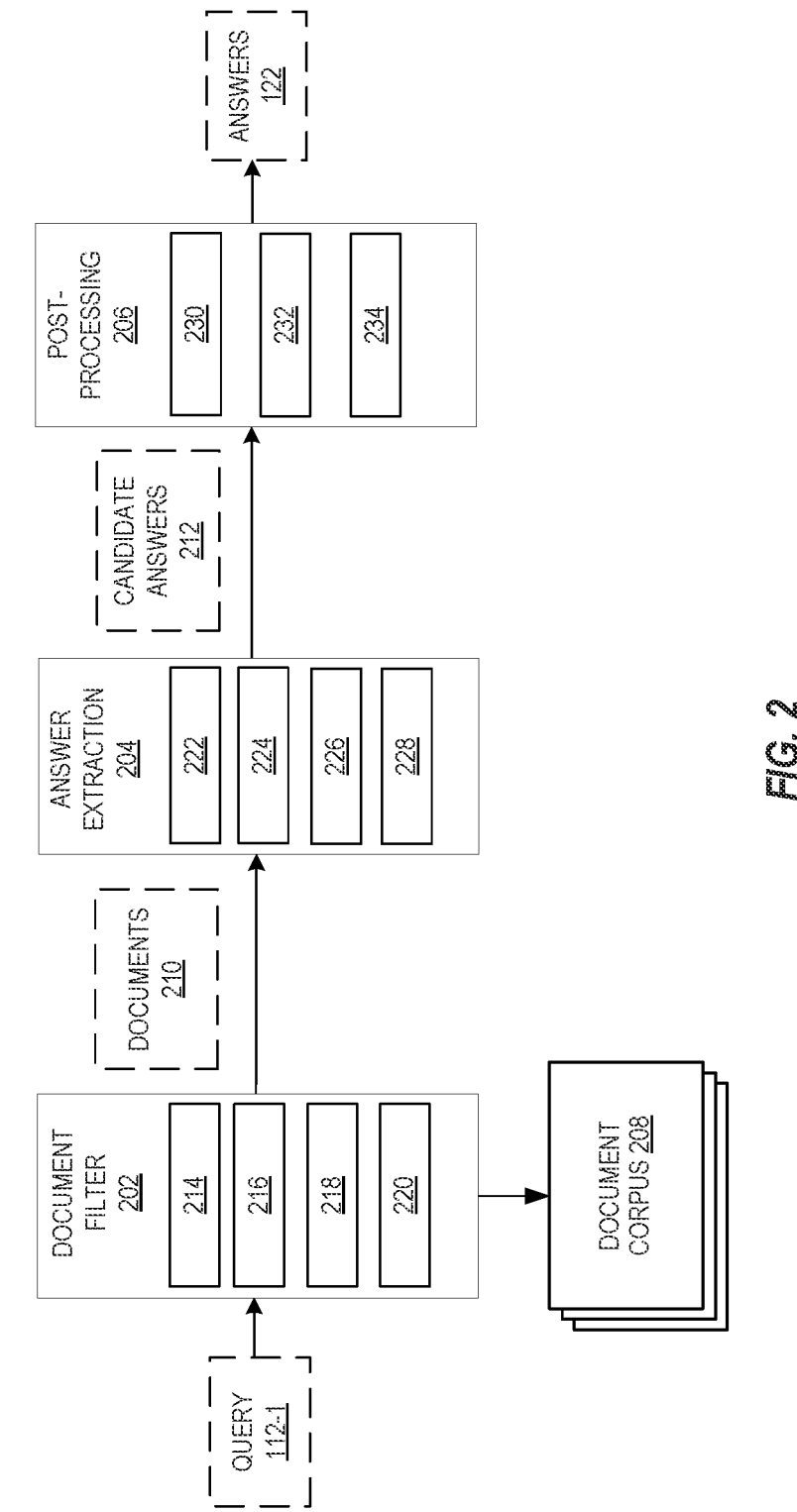
FIG. 2 is block diagram depicting execution of NLP workflow for a given query, in accordance with an example.

FIG. 2 is a block diagram depicting execution of an NLP workflow for a given input query, in accordance with an example. The NLP workflow 116 defines an order of execution of the stages of the NLP workload pipeline 114. The NLP workflow 116 may include a document filter stage 202, an answer extraction stage 204, and a post-processing stage 206. The document filter stage 202 receives a query (e.g., query 112-1) as input and identifies relevant documents 210 from a document corpus 208, which may be a database of documents, such as web pages, text files, image files, spreadsheet files, and the like. The answer extraction stage 204 extracts candidate answers 212 from the documents 210 identified by the document filter stage 202. The post-processing stage 206 determines relevant answers 122 from the extracted candidate answers 212. While this example discusses the invention in relation to these specific stages, additional and alternative stages are contemplated, including a pre-processing stage, and the like.

Each stage 202-206 includes a plurality of ML models having varying service provider resource specification. In some examples, the ML models of a stage may be executed by different resource types including CPU, GPU, and the like. In other examples, the ML models may be executed by similar or same resource type and have different resource consumption levels for execution. For instance, in a particular stage, the ML models may be executed by one of CPU, GPU, or the like, but may require different levels of resource consumption. In some examples, the ML models may be executed by different resource types and may have different levels of resource consumption. The resource consumption level indicates the amount of consumption of resources and is used to classify an ML model as requiring a large amount of a given resource, a medium amount of a resource, or a small amount of a resource. As could be understood by a person having ordinary skill in the art, there are several ways to measure and describe resource utilization (e.g., percentage, margin to threshold, value, time over threshold, etc.), and all such ways are contemplated as possible ways to indicate the resource consumption level in the specification.

As depicted in FIG. 2, the document filter stage 202 includes a plurality of ML models 214, 216, 218, 220). In some examples, the plurality of ML models may include a Bidirectional Encoder Representations from Transformers or BERT model 214, term frequency-inverse document frequency or TF-IDF 216, lucene search 218, and a domain-specific searchbased model 220. The resource type of the plurality of models 214-220 is CPU resources, for example. The plurality of models in the document filter stage have different resource consumption level. For example, the BERT model has a high resource consumption level, TF-IDF 216 has a moderate resource consumption level, lucene search 218 has a low resource consumption level, and the domain-specific search-based model 220 has a high resource consumption.

The answer extraction stage 204 includes the plurality of ML models 222, 224, 226, and 228. In some examples, the plurality of ML models may include a large BERT models 222, a domain-specific model 224, generic NLP models 226, and smaller BERT models 228. The resource type of the plurality of models 222-228 is GPU resources, for example. The plurality of models in the answer extraction stage have different resource consumption level. For example, the large BERT model 222 has a high resource consumption level, the domain-specific model 224 and the generic NLP models 226 have a moderate resource consumption level, the BERT Base, BERT medium. BERT tiny models 228 have a moderate resource consumption level.

The post-processing stage 206 includes the plurality of ML models 230, 232, and 234. In some examples, the plurality of ML models may include a pipeline analytics 230, a clustering model 232, and a domainspecific named entity recognition (NER) model 234. The resource type of the plurality of models in the post-processing stage 206 is GPU and/or CPU resources, for example. The plurality of ML models in the post-processing stage 206 have different resource consumption level. The pipeline analytics 230 has a low resource consumption of CPU, the clustering model 232 has a high resource consumption level and is executed by GPU and CPU. The domain-specific named entity recognition (NER) 234 has a high resource consumption and is executed by CPU.

On receiving a query 112-1, at system 102 for example, a set of ML models are selected for determining an answer. The selection of ML models is performed such that one or more ML models are selected from each stage 202-206 in the NLP workflow 116. In some examples, the choice of ML model selected is determined based on the available service provider resources and the service provider resource specification of the ML model. For example, the resource type of ML models 214-220 in the document filter stage 202 is CPU. To select one of the models from 214-220, the utilization of CPU resources in the service provider resources of system 102 may be determined. Based on the availability of the CPU in the service provider resources, a ML model is selected from the document filter stage 202. Similarly, the ML models are selected from the answer extraction stage 204 and the post-processing stage 206. In some examples, the selection of model in each stage may be performed at different instances. For example, a model at a stage (e.g. answer extraction stage) may be selected just before receiving an input (e.g., documents 210).

The set of ML models selected may include 214, 222, and 230, for example. The received query 112-1 is provided as input to the BERT model 214. In some examples, the query may be pre-processed before inputting to the BERT model 214. The BERT model 214 is executed on the CPU resource and provide output for the query. The output includes a collection of documents 210 from the document corpus 208 that may include relevant answers to the query. The identified documents 210 are provided as input to the large BERT model of the answer extraction stage 204. The large BERT model identifies portions (or candidate answers) 212 of the documents that may have relevant answers. The identified portions 212 are provided as input to the post-processing stage 206 for ranking the candidate answers based on a relevancy score. Based on the relevancy scores, the most relevant answers 122 are transmitted to the requesting client 104-1.

In some examples, each stage 202, 204, and 206, may include an ensemble model. Ensemble model may refer to a combination of ML models processing an NLP operation. For example, the document filter stage 202 may include an ensemble model including one or more of BERT 214, TF-IDF 216, lucene search 218 and a domain-specific search-based model 220. The answer extraction stage 204 may include an ensemble model including one or more of BERT 222, domain-specific models 224, generic NLP models 226, smaller BERT models 228, and the like. The postprocessing stage 206 may include an ensemble model including one or more of pipeline analytics 230, clustering models 232, and domain-specific models NER model 234. The ensemble models may have the highest resource consumption level in a stage and used for identifying a larger corpus of documents.

In some examples, the NLP workflow 116 may include a preprocessing stage (not shown in figure) to perform text preprocessing before providing the query to the document filter stage 202. Based on the received query, text preprocessing may be performed on the document corpus 208. In some examples, text preprocessing may include tokenization, normalization, and noise removal. Tokenization may include splitting of large text strings into smaller pieces or "tokens", such as sentences, words, or letters. The text may be normalized by converting the tokens into a standard format, such as lowercase. Noise removal may include cleaning the text by removing whitespaces, punctuation marks, etc. In some examples, text pre-processing may include word embeddings for representing the words in each document in a vector space. In some examples, the results of text pre-processing may be stored in a cache memory for immediate retrieval for performing NLP operations in response to a received query.

FIG. 3 is a flowchart illustrating an example method for answering queries using an NLP workflow. In some examples, method 300 may be encoded as instructions in a computer readable medium and executed on a system, such as system 102.

In block 302, a query is received from a first client of a plurality of clients. In some examples, on receiving the query a text pre-processing of the query may be performed. For example, the first query may be split into smaller tokens, such as letters, spaces, whitespaces, punctuation marks, line breaks, etc. The tokens may be converted into a standard format, such as lowercase. Further, the text may be cleaned by removing unnecessary tokens, such as spaces, whitespaces, punctuation marks, line breaks, etc. In some examples, the text pre-processing of the document corpus may be performed. For example, the text pre-processing of the documents may include converting the documents in the document corpus into word embeddings, which may represent the words in each document in a vector space. The vector space may represent the words having a similar property (e.g., words having the same or similar meaning) to have similar representations. In other examples, the results of the pre-processing of the document corpus, as described herein, may be stored in a cache memory.

In block 304, a set of ML models are selected based on available service provider resources for processing the query. As described in relation to FIG. 1 and FIG. 2, each ML model in the set of ML models corresponds to a respective stage of the NLP workflow. In certain examples, the selection of ML models is based on available service provider resources and a number of queries received. For example, in instances where the number of queries received greater than a threshold number and the utilization of service provider resources is high, then ML models having low resource consumption level may be selected. Based on an increase or decrease in the number of queries and utilization of service provider resources, the set of ML models are dynamically changed.

In block 306, the query is input to a first ML model of the set of ML models. In block 308, the results from each ML model are input to the next ML model in the order defined by the NLP workflow. In block 310, a query answer is determined based on the results and is transmitted to the first client 104-1.

Figure 4:
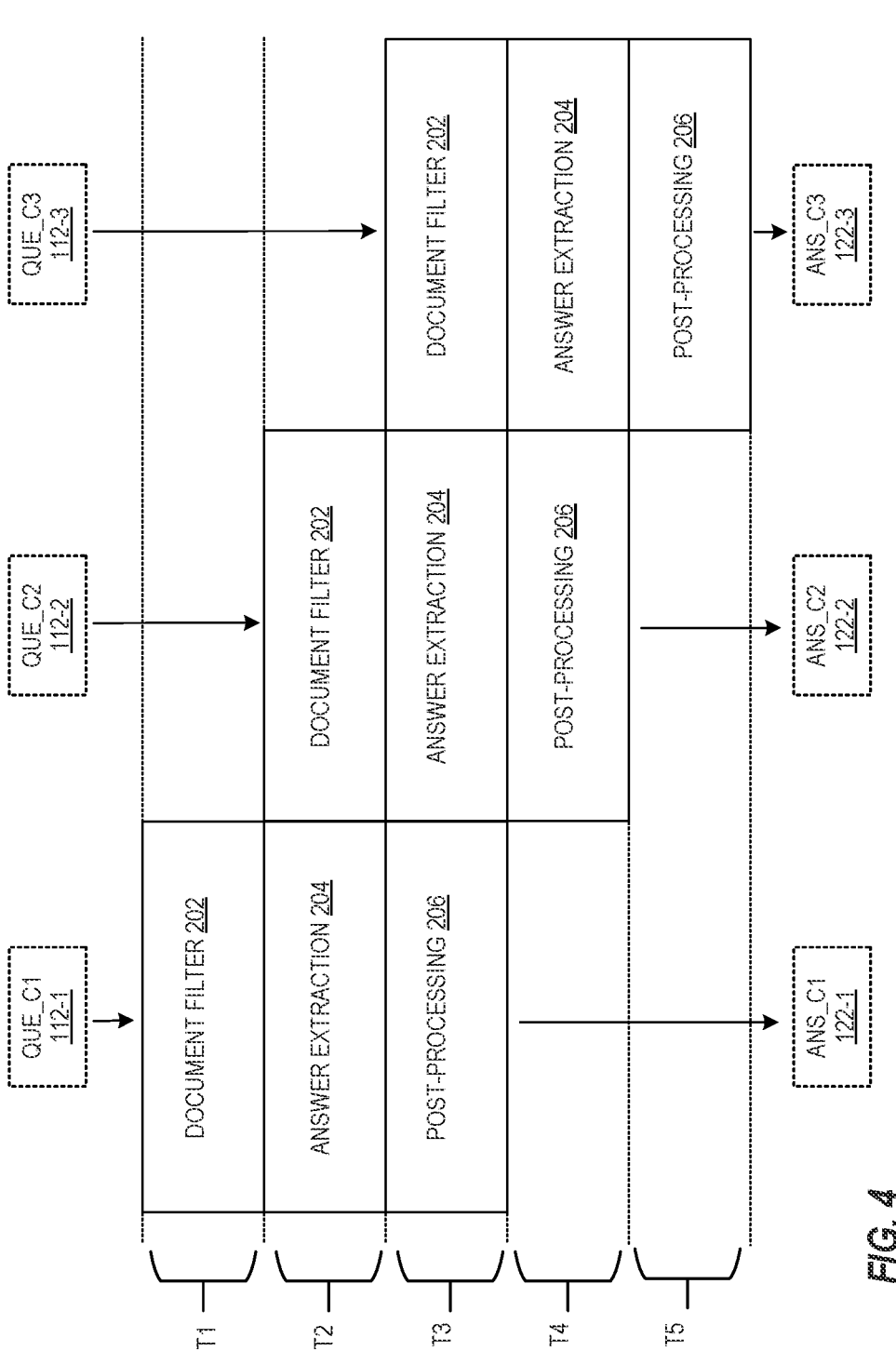
FIG. 4 depicts parallel execution of stages in an NLP workflow, in accordance with another example.

FIG. 4 depicts a diagram 400 depicting parallel execution in the NLP workflow 116, according to an example. The NLP workflow 116 includes the document filter stage 202, the answer extraction stage 204, and the post-processing stage 206. The stages 202-206 include one or more ML models (not shown in FIG. 4). The parallel execution of the stages 202, 204, and 206 includes simultaneous execution of ML models in one or more of the document filter stage 202, the answer extraction stage 204, and the post-processing stage 206.

In some examples, the queries 112-1, 112-2, 112-3 are provided as an input to document filter stage 202 of the NLP workflow 116 at different time slices. For instance, the first query 112-1 (labeled as QUE_1) is provided as input at time T1, the second query 112-2 (labeled as QUE_C2) is provided as input at time T2, and the third query 112-3 (labeled as QUE_C3) is provided as input at time T3.

At time T1, the document filter stage 202 receives the first query 112-1 as an input. The document filter stage 202 identifies one or more documents based on the first query 112-1. For example, one or more ML models (e.g., 214, 216, 218, 220) select documents from a document corpus 208 based on the first query 112-1. The one or more ML models of the document filter stage 202 are selected for execution based on the available service provider resources at T1 and the resource specification of the ML models in the document filter stage 202. In some examples, the selection of ML models may also be based on other factors, such as total number of queries received at T1. Based on the execution of the selected ML model, a likelihood score may be determined for each document. The likelihood score may be a measure indicating a probability that a document includes relevant answers to a given query (e.g., first query 112-1). One or more documents are selected that have a likelihood score greater than a predetermined threshold likelihood score, for example.

At time T2, the answer extraction stage 204 and the document filter stage 202 are executed in parallel. For instance, the answer extraction stage 204 receives the one or more documents identified at T1 for the first query 112-1 as input and extracts one or more candidate answers from those documents. One or more ML models (e.g., 222, 224, 226, 228) are selected for execution based on the available service provider resources at T2 and the service provider resource specification of each ML model in the answer extraction stage. In some examples, the selection of ML models may also be based on other factors, such as total number of queries received at T2. The selected ML model is executed to identify portions of the identified documents that includes relevant answers to the first query 112-1. The portions may include one or more of pages, passages, sentences, words, and the like, that match with the first query 112-1. In some examples, confidence scores may be determined based on the match between the portions of the document and the query. For instance, a confidence score may increase with an increase in the match between a portion of a document and the query. In some examples, the confidence score may depend on a frequency of matched portions in a document, a position of the matched portion in the document, etc. Further, the document filter stage 202 receives the second query 112-2 as an input and identifies one or more documents for the second query 112-2.

At time T3, the post-processing stage 206, the answer extraction stage 204, and the document filter stage 202 are executed in parallel. The post-processing stage 206 receives the candidate answers for the first query 112-1 extracted at time T2 and determines one or more relevant answers 122-1 (labeled as ANS_C1) for the first query 112-1. One or more ML models in the post-processing stage 206 are selected for execution based on the available service provider resources at T3, and the service provider resource specification of each ML model in the postprocessing stage 206. The selected ML model is executed to determine a relevancy score for each candidate answer. The relevancy score may be a measure of the relevancy of the candidate answers with respect to the query. The candidate answers are ranked based on the relevancy scores. Further, the answer extraction stage 204 receives the documents for the second query 112-2 identified at time T2 and extracts one or more candidate answers for the second query 112-2. Further, the document filter stage 202 receives the third query 112-3 and identifies one or more documents for the third query 112-3.

At time T4, the post-processing stage 206 and the answer extraction component 204 are executed in parallel. The post-processing stage 206 receives the candidate answers for the second query 112-2 extracted at time T3 and determine the one or more relevant answers 1222 (labeled as ANS_C2) for the second query 112-2. The answer extraction stage 204 receives the documents associated with third query 112-3 identified at time T3. At time T5, the post-processing stage 206 receives the candidate answers associated with third query 112-2 extracted at time T4 and determines the one or more relevant answers 122-3 (labeled as ANS_C3) for third query 112-3.

Figure 5:
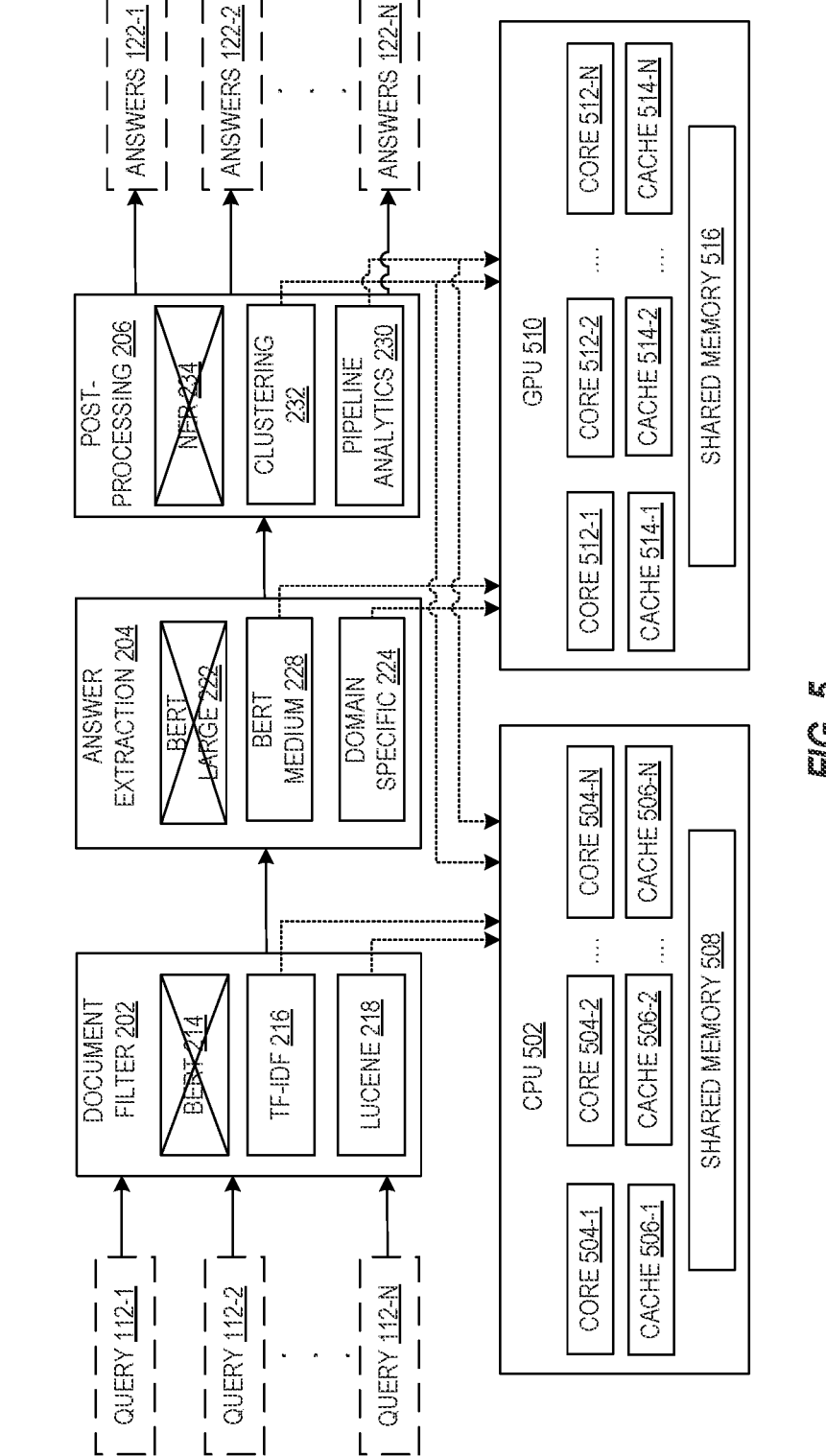
FIG. 5 is a block diagram depicting a dynamic selection of models in each stage of the NLP workflow, in accordance with an example.

FIG. 5 is a diagram 500 depicting a selection of ML models in each stage of the NLP workflow 116, according to an example.

In some examples, the resource type includes CPU resources 502, such as CPU processing cores 504-1, 504-2, . . . , 504-N, associated CPU cache 506-1, 506-2, 506-N, and shared memory resources 508. The resource type also includes GPU resources 510, such as GPU processing cores 512-1, 512-2, . . . 512-N, associated GPU cache 514-1, 514-2, 514-N, and shared memory resources 516. In some examples, the resource type includes a combination of CPU resources 502 and GPU resources 510.

In some examples, the resource type for execution of the ML models in each stage may be CPU resources, GPU resources, or a combination of thereof. For example, the ML models in the document filter stage 202 including the BERT 214, TF-IDF 216, and lucene search 218 are executed by CPU resources. The ML models in the answer extraction stage 212 including the BERT Large 222, domain-specific models 224, and BERT medium 228 are executed by GPU resources. Further, the ML models in the post-processing stage 206 includes pipeline analytics 230, clustering 232, and NER 234 are executed by at least one of CPU and GPU resources.

Further, the resource consumption level of the ML models may be low resource consumption level, moderate resource consumption level, and high resource consumption level, for example. In some examples, low resource consumption level may refer to less than 20% of the utilization of the resource. In some examples, moderate resource consumption level may refer to utilization of 20% to 60% of a resource. In some examples, high resource consumption level may refer to utilization of more than 60% of a resource.

In some examples, each stage includes a ML model having a low resource consumption level, moderate resource consumption level, and high resource consumption level. For example, ML models including BERT 214 in document filter stage 202, BERT large 218 in answer extraction stage 204, clustering 232 and NER 234 in post-processing stage 206, have high resource consumption level. ML models including TF-IDF 216 in document filter stage 202, BERT medium 224 and domain-specific models 220 in answer extraction stage 204 are have moderate resource consumption level. Further, ML models including lucene search 218 in document filter stage 202, pipeline analytics 230 in post-processing stage 206 have low resource consumption level.

In an example, the ML models BERT embedding 214, BERT Large 222, and pipeline analytics 230 may be executing in parallel for processing multiple queries (e.g. 112-1, 112-2, 112-3, . . . , 112-N), respectively, at a given point of time. In instances where the utilization of available service provider resources is greater than a threshold and/or the number of queries received from the plurality of clients 104-N is greater than a threshold number, the ML models may be dynamically selected (or reselected) in the stages. Specifically, the ML models in the stages are dynamically selected for execution by the CPU and/or GPU resources based on a comparison of service provider resource specification, which indicates resource type and resource consumption level, and available service provider resources. For example, in response to an increase in utilization of CPU and GPU resources, the selection or execution of already selected high resource-consumption level models, such as BERT 214, BERT Large 222, NER 234, or clustering 232, may be avoided or stopped. Instead, moderate or low resource consumption level models, such as TFIDF or lucene search in document filter stage 202, BERT medium 224 or domain-specific models 220 in answer extraction model, and pipeline analytics 230 from the post-processing model 206, may be selected for processing the queries. Similarly, in response to the number of queries received increases beyond a threshold number, the ML models may be reselected dynamically.

Further, one or more relevant answers for a query are determined from a document corpus based on the execution of the dynamically selected ML models. Each relevant answer of the one or more relevant answers for a query have a relevancy score determined using the one or more ML models.

In some examples, determining the relevant answers includes identifying one or more documents from the document corpus 208 using the ML models selected from the document filter stage 202. The selected ML model in the document filter stage 202 perform an analysis of the document corpus 208. For example, the BERT model 214 performs a similarity search between the query and the documents. The similarity search includes performing a syntactic and semantic comparison of the query and the documents. In some examples, the BERT model 214 compares the query with passages or sentences of each document in the document corpus. Further, the TF-IDF 216 is a numerical statistic for determining the importance of a word in a document in a corpus and a question. TF-IDF uses the words in a query as a weighting factor to search for relevant documents in the document corpus. The lucene search uses the query as input and filters a set of documents containing words or tokens that are similar to the query.

A likelihood score is determined for the output of one or more of the ML models in the document filter stage 202. The likelihood score indicates the likelihood of a document having relevant answers to the first query. For each document, a match between the contents of the document and the query is performed. The likelihood score may increase with an improved match between the query and the document, for example. In some examples, the likelihood score for a document is compared with a threshold likelihood score. One or more documents having a likelihood score greater than the threshold likelihood score are selected.

Further, determining the relevant answers includes extracting one or more candidate answers from the one or more identified documents based on the execution of one or more ML models in the answer extraction stage 204. For example, the BERT Large 222 and BERT medium 228 may use language-based embeddings to identify words, sentences, passages or paragraphs, or pages containing one or more of the words in the query. The accuracy of identification may vary based on the type of BERT model selected. For example, the BERT model 222 may provide a more accurate identification of the portions of the documents compared to BERT medium 228. The portions include one or more of pages, passages, sentences, words, and the like. Further, the domain specific models 224 include BERT models, which may be trained to identify words, such as jargons, in a specific topic or domain. For example, a biology-related BERT model (e.g., BioBERT model) may be used for identifying portions of the documents related to biology, for example.

A confidence score is determined for the output of the ML models in the answer extraction stage 204. The confidence score indicates an accuracy of the identified portions in the documents with respect to a given input query. The confidence score is based on a match between the portions of the document and the query. For instance, a confidence score may increase with an increase in the match between a portion of a document and the query. In some examples, the confidence score depends on a frequency of the matched portions in a document, a position of the matched portion in the document, etc.

Further, determining the relevant answers includes determining a relevancy score for each candidate answer and ranking the candidate answers based on the execution of one or more ML models in the postprocessing stage 206. The pipeline analytics 230 determines a relevancy score based on the scores obtained in the document filter stage 202 and the answer extraction stage 204. The relevancy score may be a measure of the relevancy of the candidate answers with respect to the query. For example, relevancy score may be based on the likelihood score and the confidence score determined at the document filter stage 202 and the answer extraction stage 204, respectively. Further, the relevancy score may also be determined based on clustering the candidate answers using clustering models 228, such as k-means clustering. For example, the candidate answers having similar semantics may be grouped in same clusters. The NER 234 model identifies and classifies named entities in the candidate answers into predefined categories. The named entity may include location names, person names, organization names, and the like.

Further, the candidate answers may be ranked based on the relevancy scores. The candidate answers having a higher relevancy score may have a higher rank. Additionally, the portions of the ranked answers may be highlighted for providing context based on the query. In some examples, the post-processing stage 206 filters some of the relevant answers based on a geographical location. Further, the one or more relevant answers are transmitted to the clients based on the relevancy scores.

Figure 6:
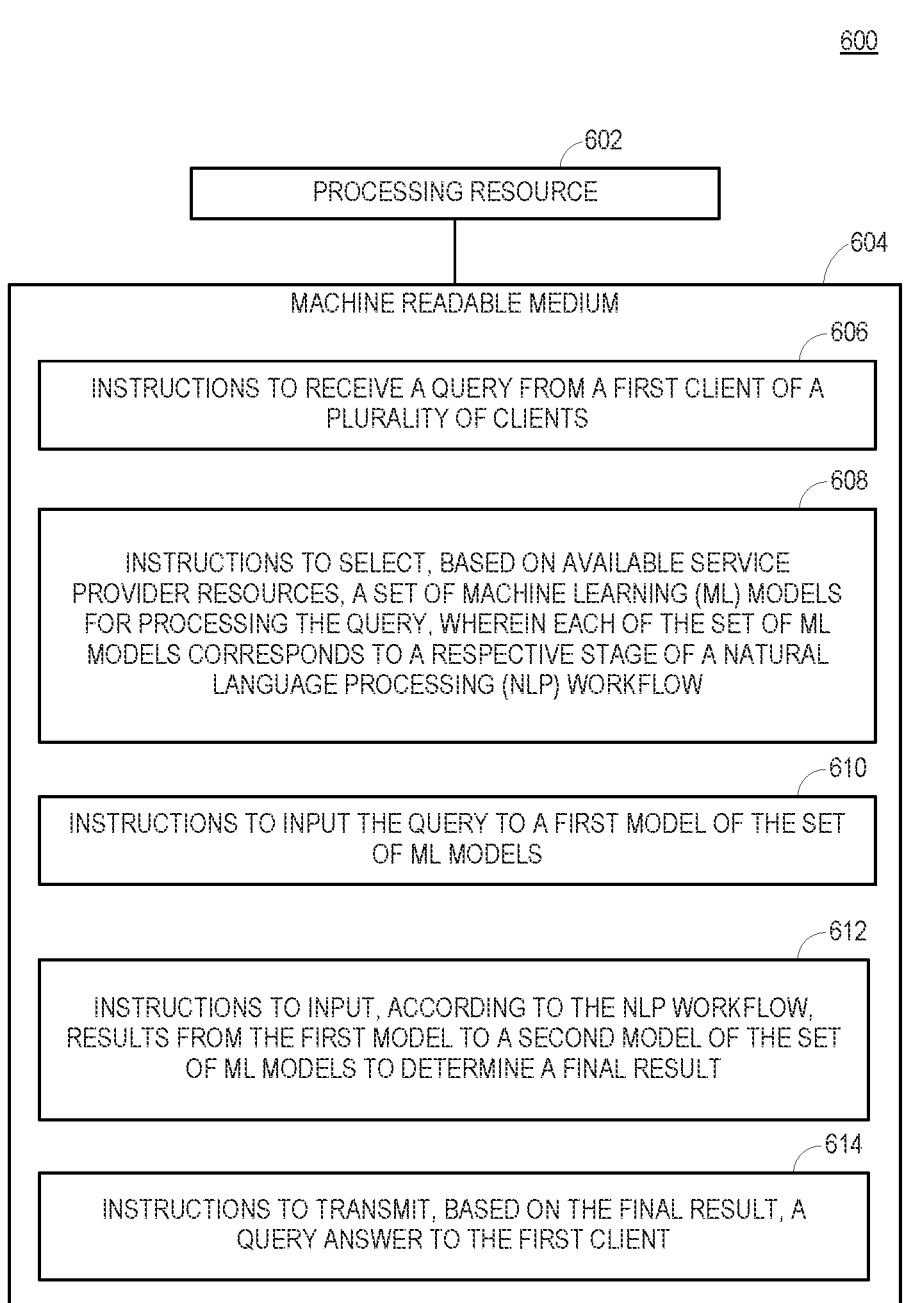
FIG. 6 is a block diagram depicting a processing resource and a machine-readable medium encoded with example instructions to determine answers to queries using NLP workflow, in accordance with an example.

Moving to FIG. 6, a block diagram 600 depicting a processing resource 602 and a machine-readable medium 604 encoded with example instructions to facilitate an NLP workflow for answering queries, in accordance with an example. The machine-readable medium 604 may be non-transitory and is alternatively referred to as a non-transitory machinereadable medium 604. In some examples, the machine-readable medium 604 may be accessed by the processing resource 602. In some examples, the processing resource 602 may represent one example of the processing resource 106 of the system 102. Further, the machine-readable medium 604 may represent one example of the machine-readable medium 108 of the system 102. As described in detail herein, the machine-readable medium 604 may be encoded with executable instructions 606, 608, 610, 612, and 614 (hereinafter collectively referred to as instructions 606-614) for performing the method 300 described in FIG. 3. Although not shown, in some examples, the machine-readable medium 604 may be encoded with certain additional executable instructions to perform the method 300 of FIG. 3, and/or any other operations performed by the system 102, without limiting the scope of the present disclosure. In some examples, the processing resource 602 may fetch, decode, and execute the instructions 606-612 stored in the machinereadable medium 604 to determine answers for queries using the NLP workflow 116.

The processing resource 602 may be a physical device, for example, one or more CPU, one or more semiconductor-based microprocessor, one or more GPU, ASIC, FPGA, other hardware devices capable of retrieving and executing the instructions 606-614 stored in the machine-readable medium 604, or combinations thereof. In certain examples, as an alternative or in addition to retrieving and executing the instructions 606614, the processing resource 602 may include at least one IC, other control logic, other electronic circuits, or combinations thereof that include a number of electronic components for performing the functionalities intended to be performed by the system 102 of FIG. 1.

The instructions 606 when executed causes the processing resource 602 to receive a query from a first client of a plurality of clients. Further, the instructions 608 when executed causes the processing resource 602 to select a set of ML models based on available service provider resources for processing the query. Each ML model corresponds to a stage of the NLP workflow. Furthermore, the instructions 610 when executed causes the processing resource 602 to input the query to a first model of the set of ML models. Moreover, the instructions 612 when executed causes the processing resource 602 to input results from first model of a first stage to second model of second stage and so on according to the NLP workflow to determine a final result. Further, the instructions 614 when executed by the processing resource 602 may cause the processing resource 602 to transmit a query answer based on the final result to the first client.

As used herein, the machine-readable medium may be any electronic, magnetic, optical, or other physical storage device that may store data and/or executable instructions. For example, the machine-readable medium may include one or more of a Random Access Memory (RAM), an Electrically Erasable Programmable Read-Only Memory (EEPROM), a storage drive, a flash memory, a Compact Disc Read-Only Memory (CDROM), and the like. The machine-readable medium may be non-transitory. As described in detail herein, the machine-readable medium may be encoded with the executable instructions to perform one or more methods, for example, method described in FIG. 3. In the examples described above, functionalities described as being performed by "instructions" may be understood as functionalities that may be performed by those instructions when executed by the processing resource. In other examples, functionalities described in relation to instructions may be implemented by any combination of hardware and programming.

As used herein, the service provider resource may be one or more physical devices, for example, one or more central processing unit (CPU), one or more semiconductor-based microprocessors, one or more graphics processing unit (GPU), application-specific integrated circuit (ASIC), a field-programmable gate array (FPGA), other hardware devices capable of retrieving and executing instructions stored in the machinereadable medium, or combinations thereof. The service provider resource may fetch, decode, and execute the instructions stored in the machinereadable medium to determine answers for queries using an NLP workflow. In addition to executing the instructions, the service provider resource may execute the ML models of the NLP workflow as described herein. Further, the service provider resource may also include at least one integrated circuit (IC), control logic, electronic circuits, or combinations thereof that include a number of electronic components for performing the functionalities intended to be performed by the device. Moreover, in certain examples, where the device may be a virtual machine or a containerized application, the service provider resource and the machine-readable medium may represent a processing resource and a machine-readable medium of the hardware or a computing system that hosts the system as the virtual machine or the containerized application. In some examples, the service provider resource may include virtual resources provisioned through a virtual machine executing on IaaS provider server.

Examples of the network may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network may be enabled via a wired (e.g., copper, optical communication, etc.) or wireless communication technologies. In some examples, the network may be enabled via private communication links including, but not limited to, communication links established via wireless, wired (e.g., copper), and the like. In some examples, the private communication links may be direct communication links between the system and the plurality of clients.

The plurality of clients may be devices including a processor or microcontroller and/or any other electronic component, or a device or system that may facilitate various compute and/or data storage services. Examples of the plurality of clients may include, but are not limited to, a desktop computer, a laptop, a smartphone, a server, a computer appliance, a workstation, a storage system, or a converged or hyperconverged system, and the like. The plurality of clients may have similar or varying hardware and/or software configurations in a given implementation of the networked system. In some examples, the plurality of clients may be service, such as a web service or a microservice coupled through an application programming interface (API).

The term "system" may refer to a heterogenous computing system facilitating resources, for example, compute, storage, and/or networking capabilities, for one or more workloads to execute thereon. Examples of the system may include, but are not limited to, a server, clusters of servers, container-orchestration systems, clusters of containerorchestration systems, a computer appliance, a workstation, a desktop computer, a laptop, a smartphone, a storage system, a converged or hyperconverged system, and the like. By way of example, while some systems may have high-end compute capabilities, some systems may facilitate strong data security, and certain systems may have enhanced thermal capabilities. Further, in certain examples, the system may be or may include a virtual machine or a containerized application executing on hardware in the network.

The term "workload" may refer to an executable including, but not limited to, an application (e.g., software program), a virtual machine (VM), a container, a pod, or a containerized application. In examples above, the workload is described as an NLP workload and the system may be a system in one or more container orchestration system clusters. Applications in containers may be managed via a container-orchestration system such as, for example, Kubernetes. In some examples, workload may include any piece of code that may be developed as a microservice. As will be understood, a workload such as a VM may be an instance of an operating system hosted on a given worker node via a VM host program, such as a hypervisor. Further, a workload such as a container may be a packaged application with its dependencies (e.g., operating system resources, processing allocations, memory allocations, etc.) hosted on a given worker node via a container host programs such as a container runtime (e.g., Docker Engine), for example. Further, in some examples, workloads may include pods that are formed by grouping one or more containers. For example, a set of containers that are associated with a common application may be grouped to form a pod.

The term "query" refers to a request for information received from a client. The request is represented in text and framed in any language used by humans. In some examples, the query may include a question, statement, one or more words, and the like. In some examples, the query does not necessarily include an explicit question. Rather, and as would be appreciated by a person having skill in the art, a query may include any communicative interaction between the system and the client that may result in retrieval and exchange of information.

The term "machine learning models" or "ML models" refers to one or more methods, algorithms, statistical models, mathematical models, or computer systems trained to identify patterns and correlations, predict answers through inferences and probability, for a given input query. The ML models may be or may include a set of machine-executable instructions capable of performing natural language processing operations, such as document filtering, answer extraction, answer ranking, and the like. The ML models may be one of a container, a pod, a virtual machine, or a containerized application.

The term "stage" refers to a component of a workload, such as NLP workload. The component may be a set of instructions, a function, a class, a module, a microservice, a container, a package, or any other software component of a larger workload, such as NLP question-answering application. In examples described herein, a stage may include a plurality of ML models for performing NLP processing operations, such as document filtering, answer extraction, post-processing, pre-processing, and the like.

The term "software pipeline" or "NLP workload pipeline" may refer to an architecture of an NLP workload that allows a series of stages or components of that NLP workload to be executed separately and independent of each other on the same or different computing resources. The pipeline may allow simultaneous execution of different stages for processing multiple queries, where one stage may be executed to process a first query and another stage may be executed to process a second query. In some examples, the pipeline allows deployment and execution of the stages in different computing systems (e.g., system 102) in same or different geographical locations.

The term "natural language processing workflow" or "NLP workflow" refers to an order of execution of the stages of the NLP workload. On receiving a query, the stages are executed according to the defined order such that outputs from one stage is provided as input to the next stage in the order. Multiple NLP workflows may be associated with a given NLP workload pipeline.

The term "query answer" refers to text identified from a document corpus that contains relevant information requested via a query.

The term "results" refers to intermediate results obtained by executing a stage or a ML model of a stage that are provided as input to a subsequent stage of an NLP workflow. Similarly, the term "final result" refers to the result obtained by the final stage of an NLP workflow.

The term "executed" refers to running an NLP workflow, a stage, a ML model, or any machine-executable instructions on a processing resource.

The term "associated with" may refer to comprises in, included in, connected to, or related to.

The term service provider resource specification refers to information of an ML mod& that specifies the resource type and resource consumption level required for execution of that model. The service provider resource specification of each ML mod& may be stored in the machinereadable medium of the system.

The term "document corpus" refers to a large body of text data within documents or a collection of documents stored in a database. The text data may include words in structured dataset and/or unstructured dataset. In various examples, the corpus may include a plurality of tokens obtained from pre-processing of the vast collection of text data in web pages, text files, image files, spreadsheet files, and other sources.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

What is claimed is:

1. A non-transitory machine-readable medium comprising instructions that, when executed by a processing resource of a computing system, cause the computing system to:

receive a first query of a first language-related task from a first client of a plurality of clients;

based on receiving the first query, dynamically select a first set of machine learning (ML) models for processing the first query, wherein the first set of ML models corresponds to a plurality of stages of a natural language processing (NLP) workflow, wherein each stage of the NLP workflow comprises a plurality of ML models, and wherein selecting the first set of ML models comprises:

for each stage of the plurality of stages, selecting a first subset of ML models from the plurality of ML models corresponding to a respective stage, the selection being made based on a resource type and a resource consumption level associated with each of the ML models of the first set of ML models, wherein each ML model of the first set of ML models comprises a same resource type and a different resource consumption level;

receiving a second query of a second language-related task that differs from the first query with respect to at least one of the plurality of stages;

based on receiving the second query, dynamically select a second set of ML models for processing the second query, wherein the second set of ML models corresponds to the plurality of stages of the NLP workflow and is selected from the plurality of ML models corresponding to each stage, wherein selecting the second set of ML models comprises, for each stage of the plurality of stages, selecting a second subset of ML models from the plurality of ML models corresponding to a respective stage based on available service provider resources;

execute the NLP workflow for the second query in parallel with executing the NLP workflow for the first query, wherein a first stage of the first set of ML models are executed in parallel with a second stage of the second set of ML models and the first stage of the first set of ML models is executed at a different time than a first stage of the second set of ML models, wherein the first stage of the first set ML models is a same stage as the first stage of the second set of ML models;

input the first query to a first ML model of the first set of ML models;

input, according to the NLP workflow, results from the first ML model to a second ML model of the first set of ML models to determine a final result; and transmit, based on the final result, a query answer to the first client.

2. The non-transitory machine-readable medium of claim 1, wherein each stage of the NLP workflow is executed using a ML model selected from a plurality of ML models associated with the respective stage, and wherein each of the ML models associated with the respective stage has a service provider resource specification.

3. The non-transitory machine-readable medium of claim 1, further comprising instructions to:

receive the second query from a second client of the plurality of clients;

select, based on available service provider resources, the second set of ML models for processing the second query;

input the second query to a third ML model of the second set of ML models;

input, according to the NLP workflow, results from the third ML model to a fourth ML model of the second set of ML models to determine a second final result; and transmit, based on the second final result, a second query answer to the second client, wherein executing the NLP workflow for the second query occurs in parallel with executing the NLP workflow for the first query.

4. The non-transitory machine-readable medium of claim 3, wherein executing the NLP workflow for the second query in parallel with executing the NLP workflow for the first query is performed according to a software pipeline associated with the NLP workflow.

5. The non-transitory machine-readable medium of claim 2, wherein the service provider resource specification includes a resource type and the resource consumption level.

6. The non-transitory machine-readable medium of claim 1, further comprising instructions to:

store the query answer in a cache memory;

receive the first query from a third client of a plurality of clients; and transmit the query answer to the third client.

7. The non-transitory machine-readable medium of claim 1, wherein a first stage of the NLP workflow includes instructions to:

identify documents from a document corpus using the first set of ML models in the first stage, wherein the documents are associated with at least a threshold likelihood of having the query answer;

wherein a second stage of the NLP workflow includes instructions to:

extract candidate answers from the documents using the first set of ML models in the second stage;

wherein a third stage of the NLP workflow includes instructions to determine a relevancy score for the candidate answers in using the first set of ML models in the third stage; and rank the candidate answers based on the relevancy score.

8. The non-transitory machine-readable medium of claim 1, wherein each of the plurality of ML models corresponding to a respective stage of the NLP workflow is different from the plurality of ML models corresponding to other stages of the NLP workflow.

9. The non-transitory machine-readable medium of claim 3, wherein the available service provider resources include availability and utilization of service provider resources, and wherein the service provider resources include one or more of a Graphics Processing Unit (GPU), a Central Processing Unit (CPU), a Field-Programmable Gate Array (FPGA), memory, bandwidth, storage, and cache memory.

10. The non-transitory machine-readable medium of claim 1, wherein the first set of ML models include one or more of Bidirectional Encoder Representations from Transformers (BERT), Term frequency-inverse document frequency (TF-IDF), Domain Specific Search, Smaller BERT models, pipeline analytics, clustering models, Named Entity Recognition (NER) models, Domain Specific Natural Language Processing (NLP) models, and ensemble models.

11. The non-transitory machine-readable medium of claim 1, wherein a stage of the respective stages comprises one of a container, a pod, a virtual machine, or a containerized application.

12. A method comprising:

receiving a first query of a first language-related task from a first client of a plurality of clients;

based on receiving the first query, dynamically selecting a first set of machine learning (ML) models for processing the first query, wherein the first set of ML models corresponds to a plurality of stage of a natural language processing (NLP) workflow, wherein each stage of the NLP workflow comprises a plurality of ML models, and wherein selecting the first set of ML models comprises:

for each stage of the plurality of stages, selecting a first subset of ML models from the plurality of ML models corresponding to a respective stage, the selection being made based on a resource type and a resource consumption level associated with each of the ML models of the first set of ML models, wherein each ML model of the first set of ML models comprises a same resource type and a different resource consumption level;

receiving a second query of a second language-related task that differs from the first query with respect to at least one of the plurality of stages;

based on receiving the second query, selecting a second set of ML models for processing the second query, wherein the second set of ML models corresponds to the plurality of stages of the NLP workflow and is selected from the plurality of ML models corresponding to each stage, wherein selecting the second set of ML models comprises, for each stage of the plurality of stages, selecting a second subset of ML models from the plurality of ML models corresponding to a respective stage based on available service provider resources;

executing the NLP workflow for the second query in parallel with executing the NLP workflow for the first query, wherein a first stage of the first set of ML models are executed in parallel with a second stage of the second set of ML models and the first stage of the first set of ML models is executed at a different time than a first stage of the second set of ML models, wherein the first stage of the first set ML models is a same stage as the first stage of the second set of ML models;

inputting the first query to a first model of the first set of ML models;

inputting, according to the NLP workflow, results from the first model to a second model of the first set of ML models to determine a final result; and transmitting, based on the final result, a query answer to the first client.

13. The method of claim 12, further comprising:

receive the second query from a second client of the plurality of clients;

select, based on available service provider resources, the second set of ML models for processing the second query;

input the second query to a third model of the second set of ML models;

input, according to the NLP workflow, results from the third model to a fourth model of the second set of ML models to determine a second final result; and transmit, based on the second final result, a second query answer to the second client, wherein executing the NLP workflow for the second query occurs in parallel with executing the NLP workflow for the first query.

14. The method of claim 13, wherein executing the NLP workflow for the second query in parallel with executing the NLP workflow for the first query is done according to a software pipeline associated with the NLP workflow.

15. The method of claim 12, wherein each stage of the NLP workflow is executed using a ML model selected from a plurality of ML models associated with the respective stage, and wherein each of the ML models associated with the respective stage has a service provider resource specification.

16. A device comprising:

a processing resource;

a machine-readable medium storing instructions that, when executed by the processing resource, cause the processing resource to:

receive a first query of a first language-related task from a first client of a plurality of clients;

based on receiving the first query, dynamically select a first set of machine learning (ML) models for processing the first query, wherein the first set of ML models corresponds to a plurality of stages of a natural language processing (NLP) workflow, wherein each stage of the NLP workflow comprises a plurality of ML models, and wherein selecting the first set of ML models comprises:

for each stage of the plurality of stages, selecting a first subset of ML models from the plurality of ML models corresponding to a respective stage, the selection being made based on a resource type and a resource consumption level associated with each of the ML models of the first set of ML models, wherein each ML model of the first set of ML models comprises a same resource type and a different resource consumption level;

receive a second query of a second language-related task that differs from the first query with respect to at least one of the plurality of stages;

based on receiving the second query, select a second set of ML models for processing the second query, wherein the second set of ML models corresponds to the plurality of stages of the NLP workflow and is selected from the plurality of ML models corresponding to each stage, wherein selecting the second set of ML models comprises, for each stage of the plurality of stages, selecting a second subset of ML models from the plurality of ML models corresponding to a respective stage based on available service provider resources;

execute the NLP workflow for the second query in parallel with executing the NLP workflow for the first query, wherein a first stage of the first set of ML models are executed in parallel with a second stage of the second set of ML models and the first stage of the first set of ML models is executed at a different time than a first stage of the second set of ML models, wherein the first stage of the first set ML models is a same stage as the first stage of the second set of ML models;

input the first query to a first model of the first set of ML models;

input, according to the NLP workflow, results from the first model to a second model of the first set of ML models to determine a final result; and transmit, based on the final result, a query answer to the first client.

17. The device of claim 16, wherein the processing resource executes one or more instructions to:

receive the second query from a second client of the plurality of clients;

select, based on available service provider resources, the second set of ML models for processing the second query;

input the second query to a third model of the second set of ML models;

input, according to the NLP workflow, results from the third model to a fourth model of the second set of ML models to determine a second final result; and transmit, based on the second final result, a second query answer to the second client, wherein executing the NLP workflow for the second query occurs in parallel with executing the NLP workflow for the first query.

18. The device of claim 17, wherein executing the NLP workflow for the second query in parallel with executing the NLP workflow for the first query is done according to a software pipeline associated with the NLP workflow.

* * * * *